(No Model.)
R. N. VAN SLYKE.
TIRE TIGHTENER.
No. 380,538. Patented Apr. 3, 1888.
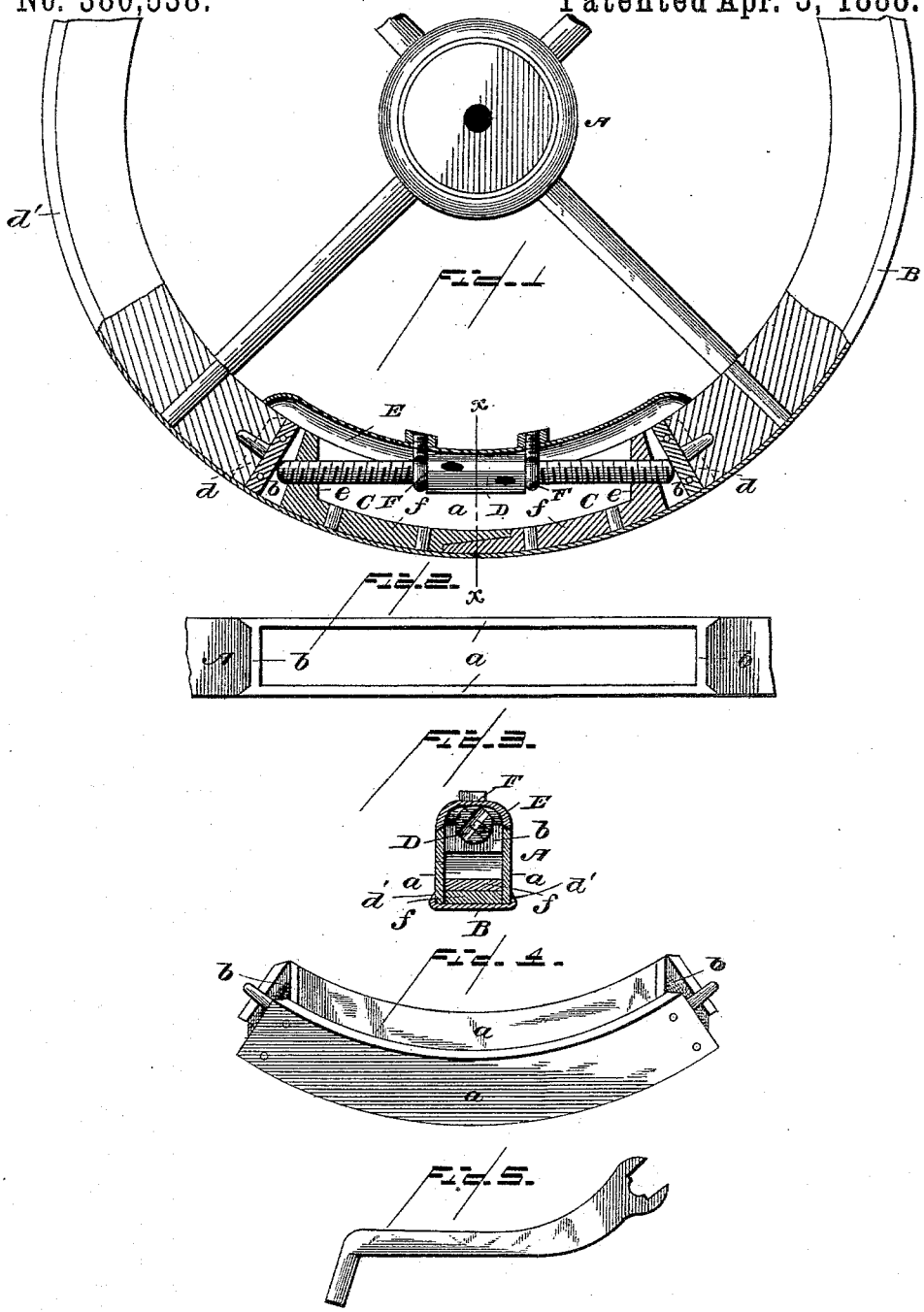
WITNESSES,
C. N. Deshiell
T. Ed. Turpin
INVENTOR,
R. N. Van Slyke.
Smith & Sheehy
Attorneys.

UNITED STATES PATENT OFFICE.

REUBEN N. VAN SLYKE, OF HAWPATCH, INDIANA.

TIRE-TIGHTENER.

SPECIFICATION forming part of Letters Patent No. 380,538, dated April 3, 1888.

Application filed November 3, 1887. Serial No. 254,142. (No model.)

*To all whom it may concern:*

Be it known that I, REUBEN N. VAN SLYKE, a citizen of the United States, residing at Hawpatch, in the county of La Grange and State of Indiana, have invented certain new and useful Improvements in Tire-Tighteners; and I do declare the following to be a full, clear, and exact description of the invention, such as will enable others skilled in the art to which it appertains to make and use the same.

This invention has relation to improvements in tires for vehicle-wheels, and also means for tightening the same without removing them from the wheel.

The invention will be fully understood from the following description and claim, when taken in connection with the accompanying drawings, in which—

Figure 1 is a sectional view of a portion of a wheel, showing my improvements applied. Fig. 2 is a top view of the metallic box removed from the felly. Fig. 3 is a cross-sectional view taken on the dotted lines $x\ x$ of Fig. 1. Fig. 4 is a perspective view of the metallic box removed from the felly, and Fig. 5 is a view of a wrench for manipulating my improvements.

Referring by letter to the said drawings, A indicates a wheel, which may be of any ordinary or approved construction, having a piece removed from the felly, as shown. In this interspace of the felly I arrange a metallic box of the form substantially as shown in Fig. 3 of the drawings. The lateral walls $a$ of this box, which are exposed to view, have their ends beyond the end walls, $b$, and terminate in tapering extensions $d$, which are designed to snugly embrace the adjacent ends of the felly and serve as a means for preventing any displacement of the box or felly. This box has its end walls provided with a dowel-pin, which is received by an aperture in the end of the felly, whereby said box and felly are firmly secured in place. It will be here observed that while the dowel-pins above referred to are designed to secure the box and felly in the interspace or cut-away portion of the felly, yet these dowel-pins will be relieved from any torsional or undue strain by the employment of the extensions on the lateral walls of the box. It should also be observed that this box is opened longitudinally on top and bottom, being closed at the sides and ends only.

B indicates the tire, which is of a peculiar construction, having an annular marginal rectangular flange, $d'\ d'$, which is designed to engage the outer sides of the felly and prevent lateral displacement of the said tire.

C indicates lugs or studs, there being one secured to the inner side of the tire near each end thereof, and both are designed to come within the box above referred to when the tire has been properly placed upon the wheel. These lugs are of angular form, their upright member $e$ screw-tapped transversely for the reception of the operating-screw, as will be presently explained. The longer branches, $f$, of these lugs are of a curvature similar to that of the tire, and are secured thereto by rivets, as shown. These branches $f$ are shouldered one upon the inner side and the other upon the outer side, so as to form lapping reduced extensions $g$, which are designed to extend beyond the ends of the tire, so as to close the interval caused by the separation of the same, and also to insure a firm and secure bearing for the wheel at this point.

D indicates the operating-screw, one end of which has a right and the other a left thread, and these threaded ends have their bearing in the threaded lugs secured to the tire. The body of the screw is provided with wrench-apertures for receiving a wrench or turning device. It will thus be seen that when the screw has been turned in one direction the lugs secured to the tire will be moved apart, thus loosening the same upon the felly, and when moved in the opposite direction the ends will be moved together, so as to tighten the tire. Therefore, when a tire has become loose or stretched after use it will not be necessary to remove the same from the wheel in order to tighten it, as the same may be done by turning the screw D in the proper direction.

E indicates a clip-plate for covering the operating parts within the box of the felly. This plate is suitably shaped and provided with transverse apertures, as shown, through which the threaded stem of eyebolts F F, encircling plain portions of the operating-bolt, extend, and nuts are applied to these bolts for securing the said plate in position.

In operation it will be seen that when the tire needs tightening it is only necessary to remove the nuts $h$ and lift off the plate, when a wrench, such as shown in Fig. 4, may be applied to the screw to turn it in the opposite direction. The plate may then be replaced and the nuts applied, after which the wheel is ready for use.

While I have shown and described my invention in connection with a tire having lateral marginal flanges, yet I do not wish to confine myself to tires of this character, as it is obvious that tires such as at present in use may be employed. It is also obvious that the metallic box may be made in a single piece, or its side and end walls may be composed of separate pieces, according to the dictation of the mechanic.

Having described my invention, what I claim is—

The combination, with the felly, of the box secured therein, the tire, the threaded lugs secured to the tire and having lapping extensions beyond the ends thereof, the threaded connections of the said lugs, the eyebolts, the covering-plate, and securing-nuts.

In testimony whereof I affix my signature in presence of two witnesses.

REUBEN N. VAN SLYKE.

Witnesses:
H. D. WILSON,
W. M. VAN SLYKE.